2,989,991
PRESSURE ACTUATED DEVICE
Max Knobel, Arlington, Mass.
(663 Beacon St., Boston, Mass.)
Filed June 2, 1958, Ser. No. 739,192
3 Claims. (Cl. 137—788)

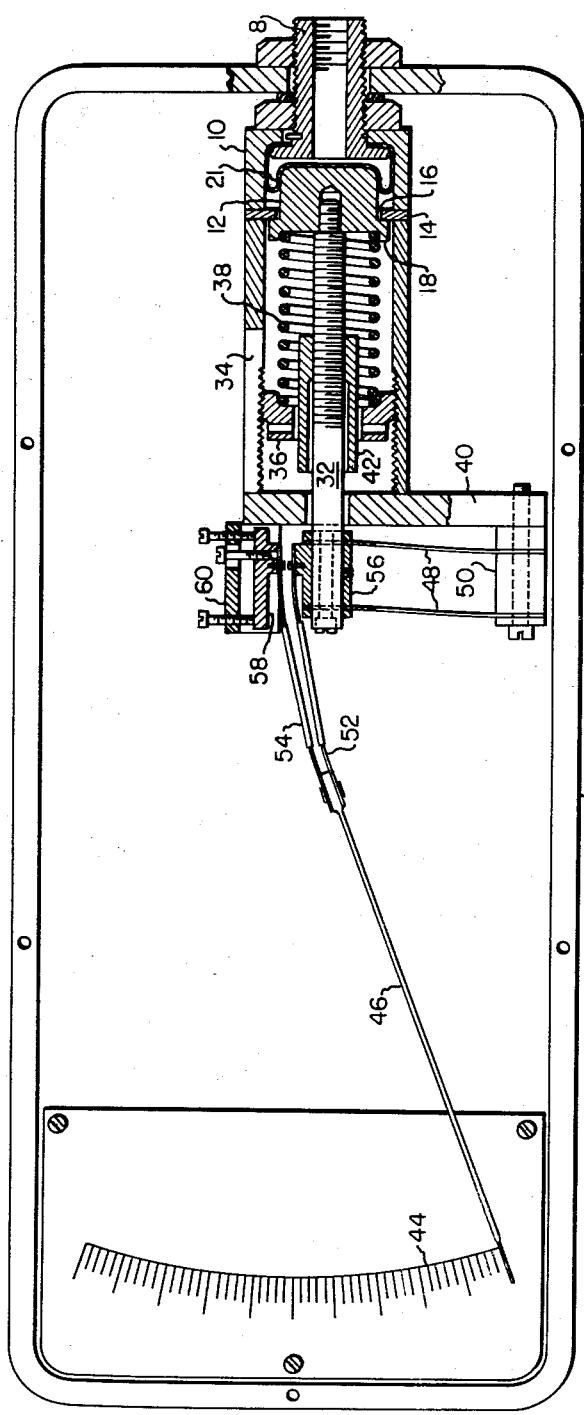
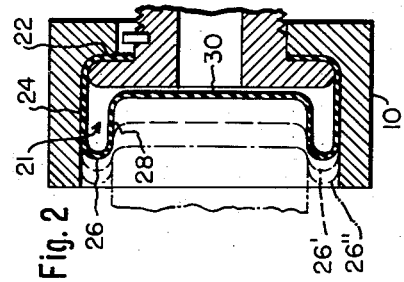
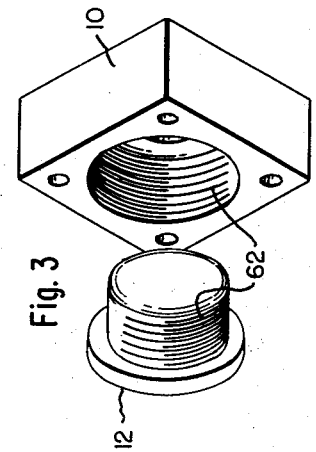
Fig. 1
Fig. 2
Fig. 3
INVENTOR.
MAX KNOBEL
BY KENWAY, JENNEY, WITTER & HILDRETH
ATTORNEYS United States Patent Office 2,989,991
Patented June 27, 1961

The present invention relates to pressure-actuated devices, such as pressure indicators.

In any pressure-actuated device it is desirable to limit friction and hysteresis to as low values as possible. This is true in any pressure-indicating system and particularly so for pressure indicators arranged for use with precision air gages of the type shown generally in the Knobel Patent 2,692,498, dated October 26, 1954. In such a gage the precision of the measurement depends upon an accurate determination of pressure, and the accuracy is seriously affected by any hysteresis that may be present in the indicating instrument. (Hysteresis is defined as a condition wherein the indication of the instrument is different for a given pressure depending on whether that pressure is approached from lower or from higher pressure values.)

The object of the present invention is to provide a pressure-actuated device, such as an indicator, in which hysteresis and friction are negligible. With this object in view the present invention comprises the pressure-actuated device hereinafter described and particularly defined in the claims.

In the accompanying drawings:

FIG. 1 is a sectional elevation of the preferred form of pressure-actuated device herein shown as embodied in a pressure indicator;

FIG. 2 is a detailed sectional view on an enlarged scale of a part of the apparatus; and FIG. 3 is a perspective view of the cup and piston shown separated from one another.

The preferred embodiment of the invention, as shown in the drawings, comprises a casing 6 provided at one end with nipple 8 which is suitably received in the casing and is adapted to be connected by a tube with the source of pressure to be measured such as the air gage of my above-mentioned patent. A cup-shaped base member 10 is suitably secured in the body by the nipple 8. Within the cup 10 is a piston 12 of somewhat smaller external diameter than the internal diameter of the cup. A diaphragm or plate 14 is suitably secured to the outer end of the cup and it has an opening slightly larger than the external diameter of the piston in order to provide a narrow annular crevice 16 around the piston. The piston has a flange 18 adapted to seat against the diaphragm to serve as a downstop for the piston.

A thin flexible membrane 21, preferably of rubber, is secured within the cup 10. The membrane is preferably about 0.015 inch in thickness. As shown on an enlarged scale in FIG. 2, the membrane is provided with a seating flange or lip 22 which is gripped between a flange on the nipple and the base of the cup. A membrane is provided with an outer wall-engaging portion 24 adapted to lie against the interior of the cup, and this portion is connected by a fold 26 with an inner cylindrical portion 28 which lies against the wall of the piston and terminates in a flat central portion 30 engaging the bottom of the piston. The construction is such that upon application of pressure the rubber membrane folds and assumes the successive positions indicated by the lines 26' and 26" in FIG. 2 while still maintaining contact with the inner wall of the cup and with the outer wall and bottom face of the piston. The precise operation of the membrane under pressure conditions will be described in further detail later.

Secured to the piston is a rod 32. The rod and piston are mounted within a sleeve 34 which is internally threaded to receive a capstan nut 36. A spring 38 bears between the capstan nut and the piston to urge the latter into its "down" position, namely, with the flange 18 seated against the diaphragm plate 14. The sleeve 34 is suitably secured to a mounting plate 40 fixed within the casing 6. The rod 32 passes through an opening in the plate which is sufficiently large so that it does not engage therewith. A limit stop 42 is preferably threaded on the rod 38 to limit the outward motion of the piston by engagement with the mounting plate 40.

The casing is provided with an indicating dial or scale 44 and the pressure is indicated by means of a needle 46. The needle is mounted by a spring suspension only, as are the rod and piston, so as to reduce friction to a negligible value. To this end the rod is suitably connected to parallel spring leaves 48, the ends of which are suitably secured to a bolt 50 attached to the plate 40. The indicating needle 46 is connected to two thin spring leaves 52 and 54, the former of which is connected to a fitting 56 carried by the outer end of the rod 32. The other spring leaf 54 is suitably connected to a stationary fitting 58 which is adjustably secured in place on a bracket 60 extending outwardly from the plate 40. It will be seen that upon outward motion of the piston 12 (that is, to the left) the needle 46 will be actuated to swing in a clockwise direction over the scale 44.

Since all of the parts are spring suspended, the only friction is that of the negligible internal friction of the metal and the internal friction introduced by the rubber of the membrane 21. It is for this reason that the membrane is made as thin as possible so that its spring rate is very small compared to the metal springs and its internal friction is extremely small.

The dimensions of the crevice 16 are important. It is necessary that the crevice be provided in order that there will be no friction between the piston 12 and the plate 14. However, the crevice should preferably be about as narrow as the thickness of the rubber. Under these conditions, even the presence of very high pressures within the membrane will not force the rubber through the crevice. High pressures may exist within the membrane since the motion of the piston is limited by the stop member 42 in which case the pressure might cause the membrane to blow out through the crevice. By making the crevice only about the size of the thicknes of the rubber and by providing a fold 26 which is several times the thickness of the rubber, blow-out under high pressures is avoided. The internal pressure causes the rubber to operate with a clean fold and without crinkling in either direction of motion of the piston.

The effects of hysteresis remain to be considered. The hysteresis in the metal parts is negligible. The hysteresis due to the rubber membrane may also be made negligible according to a feature of the invention. It will be observed that the rubber membrane is firmly pressed by the pressure against the inner wall of the cup and the outer wall of the piston. If the walls were smooth, the rubber membrane would tend to creep along the surfaces of the metal, and this would tend to give a different reading for a given pressure depending upon whether the pressure to be measured is reached from a higher or lower value. This hysteresis is reduced to a negligible factor by providing means for increasing friction between the rubber membrane and the cup and piston walls so that the rubber will not be allowed to stretch and creep over the metal surfaces, but rather will conform to the piston motion by a smooth folding action. This increase of friction is effected by any suitable means for roughening the surface. As shown in FIG. 3, this roughening is provided by forming the inner surface of the cup and the outer surface of the piston with extremely fine screw threads 62. The same result may be obtained by sandblasting the surfaces or by roughening them with coarse sandpaper.

The pressure applied by the spring 38 determines the pressure at which the piston will move from its seat and hence determines the zero or initial position on the scale. It is thus possible to utilize the entire scale for substantially any desired small part of a total pressure range. For example, when used in conjunction with an air gage of the type shown in my above-mentioned patent, the spring 38 may be set to determine a starting pressure of 20 p.s.i. and the top pressure may be 22 p.s.i., this range of pressures corresponding to motion of only a fraction of a thousandth of an inch at the gaging surface. In a typical application of my apparatus into such a gage, the pressure range between 20 and 22 p.s.i. measures 0.0001 inch at the gage. If the scale 44 is three inches long, this means that a pointer movement of three inches corresponds to an air gaging value of 0.0001 inch. Thus a millionth of an inch at the gage is indicated by a scale motion of 0.030 inch. Since such a scale motion is readily visible, the apparatus is therefore capable of a measurement sensitivity down to millionths of an inch, if friction and hysteresis effects can be reduced to truly negligible values. This is actually accomplished by the present invention, so that a high precision of measurement may be attained.

Having thus described the invention I claim:

1. A pressure-actuated measuring device for precision measurements comprising a relatively movable cup and piston, the piston being freely received within the cup, an actuator rod connected to the piston, spring-suspension means for the rod and piston to permit motion thereof without frictional engagement, means for applying fluid pressure within the cup, and a flexible membrane internally subjected to the fluid pressure and having portions engaging the internal wall of the cup and the external wall of the piston, the membrane having a smooth fold between said portions, the cup and piston having roughened surfaces to engage the membrane and to prevent stretch or creep thereof upon relative motion of the cup and piston under the action of pressure in the membrane.

2. A pressure-actuated measuring device for precision measurements comprising a relatively movable cup and piston, the piston being freely received within the cup, an actuator rod connected to the piston, a spring surrounding the rod and bearing against the piston, a plate surrounding the piston and spaced therefrom by a narrow annular crevice, the piston having a flange to engage the plate as a stop under the force of the spring, means for applying fluid pressure within the cup, and a flexible membrane internally subjected to the fluid pressure and having portions engaging the internal wall of the cup and the external wall of the piston, the membrane having a smooth fold between said portions, the width of said crevice being not substantially greater than the thickness of the membrane, the cup and piston having roughened surfaces to engage the membrane and to prevent stretch or creep thereof upon relative motion of the cup and piston under the action of pressure in the membrane.

3. A pressure-actuated measuring device for precision measurements comprising a relatively movable cup and piston, the piston being freely received within the cup, an actuator rod connected to the piston, spring-suspension means for the rod and piston to permit motion thereof without frictional engagement, means for applying fluid pressure within the cup, and a flexible membrane internally subjected to the fluid pressure and having portions engaging the internal wall of the cup and the external wall of the piston, the membrane having a smooth fold between said portions, the cup and piston having rough surfaces characterized by slight differences in depth in longitudinal directions, said surfaces acting to engage the membrane and to prevent stretch or creep thereof upon relative motion of the cup and piston under the action of pressure in the membrane.

References Cited in the file of this patent

UNITED STATES PATENTS

| | | |
|---|---|---|
| 1,077,472 | Hofmann | Nov. 4, 1913 |
| 2,126,661 | Provinson | Aug. 9, 1938 |
| 2,203,862 | Eason | June 11, 1940 |
| 2,251,443 | Fawick | Aug. 5, 1941 |
| 2,478,575 | Fitch | Aug. 9, 1949 |
| 2,718,896 | Jones | Sept. 27, 1955 |